US005801697A

United States Patent [19]
Parikh et al.

[11] Patent Number: 5,801,697
[45] Date of Patent: Sep. 1, 1998

[54] METHOD AND APPARATUS FOR PREVENTING UNINTENTIONAL PERUSAL OF COMPUTER DISPLAY INFORMATION

[75] Inventors: Shrikant N. Parikh, Mesquite; George C. Manthuruthil, Coppell; Hari N. Reddy, Colleyville, all of Tex.

[73] Assignee: International Business Machine Corp., Armonk, N.Y.

[21] Appl. No.: 709,234

[22] Filed: Sep. 3, 1996

Related U.S. Application Data

[63] Continuation of Ser. No. 135,871, Oct. 12, 1993, abandoned.
[51] Int. Cl.$^6$ ........................................... G06T 5/30
[52] U.S. Cl. ............................................... 345/342
[58] Field of Search ........................... 395/133, 135, 395/333–347; 345/118–130, 342, 433.3, 435

[56] References Cited

U.S. PATENT DOCUMENTS

| | | | |
|---|---|---|---|
| 4,571,619 | 2/1986 | Mewitz | 348/590 |
| 4,868,765 | 9/1989 | Diefendorff | 345/345 |
| 5,063,525 | 11/1991 | Kurakake et al. | 345/434 |
| 5,386,247 | 1/1995 | Shafer et al. | 348/563 |
| 5,471,533 | 11/1995 | Wang et al. | 380/51 |
| 5,638,501 | 6/1997 | Gough et al. | 345/435 |

OTHER PUBLICATIONS

Simpson, "Mastering WordPerfect 5.1 & 5.2 for Windows", Sybex, 1992, 1993.
Berzo, "WordPerfect Update to Offer Mail Support", Info-World, Oct. 19, 1992, vol. 14, No. 42, pp. 1–2.

*Primary Examiner*—Anton Fetting
*Attorney, Agent, or Firm*—A. Bruce Clay

[57] ABSTRACT

A security enhancement for laptop computers comprises the use of a moving visible area and an obscured area for the laptop screen. The visible area may be defined by the user to comprise a single word, a single line, or a plurality of lines of data. The obscured area may comprise all remaining space on the laptop screen not defined as the visible area, A user may specify that the obscured area be completely hidden from view (i.e.., such as by blackening or whiting out the area) or difficult to view by others. The present invention is particularly useful with a laptop computer in a crowded environment such as while travelling on an airplane. The present invention will reduce the likelihood of unauthorized viewing of possibly sensitive computer data by others.

12 Claims, 3 Drawing Sheets ly,697

METHOD AND APPARATUS FOR PREVENTING UNINTENTIONAL PERUSAL OF COMPUTER DISPLAY INFORMATION

This is a continuation of application Ser. No. 08/135,871 filed Oct. 12, 1993, abandoned.

TECHNICAL FIELD OF THE INVENTION

This invention relates in general to software, and in particular to a method and apparatus for preventing the unwanted viewing of computer data by persons other than the current user.

BACKGROUND OF THE INVENTION

With the proliferation of portable computer equipment, there has been a tremendous increase in the number of office workers who are able to take their computerized "office" with them on extended business trips. This capability has positive affects on the productivity of workers and thus their company/corporation. Workers have the ability to transform millions of hours that were formally wasted away during travelling into productive use. Additionally, in many cases, the office worker may be in continuous contact with the home office which can significantly enhance the quality of decision making.

While travelling, the portable computer user often runs the risk of unintentional and/or intentional examination of any information that is actively being manipulated. The potential of exposing what may be valuable company/corporate information to others can be very risky. To avoid such observation, users must typically resort to awkward and impolite techniques, such as, for example, a shade or hood which partially covers the viewing screen. A hood can be cumbersome and awkward to use and, therefore, may be counter-productive. Since it may be critical to avoid the unwanted dissemination of company/corporate information, there is a need for a method and apparatus which will allow a user to work on a portable computer while minimizing unintentional encroachment even when in the presence of many others.

SUMMARY OF THE INVENTION

The present invention provides a method and apparatus for reducing the likelihood of unauthorized viewing of computer data which substantially reduces or eliminates the problems associated with prior art devices. The present invention allows a user to work with a portable computer in a crowded environment with reduced fear of exposing valuable information to others.

In accordance with one aspect of the present invention, a method of reducing a likelihood of unauthorized observation of on-screen computer data is provided. The computer screen work area is divided into a visible area and an obscured area. The visible area allows the user to clearly see and work with data. The obscured area comprises the remaining screen area and makes it difficult or impossible to view data.

The obscured area may be completely blackened, completely whited out, greyed, over-written, blurred, etc. The visible area may comprise a single word, a single line, or a plurality of lines. The user may select the desired appearance of both areas as the need arises.

BRIEF DESCRIPTION OF THE DRAWINGS

For a more complete understanding of the present invention and the advantages thereof, reference is now made to the Detailed Description taken in conjunction with the attached Drawings, in which.

DETAILED DESCRIPTION OF THE INVENTION

Figure 1:
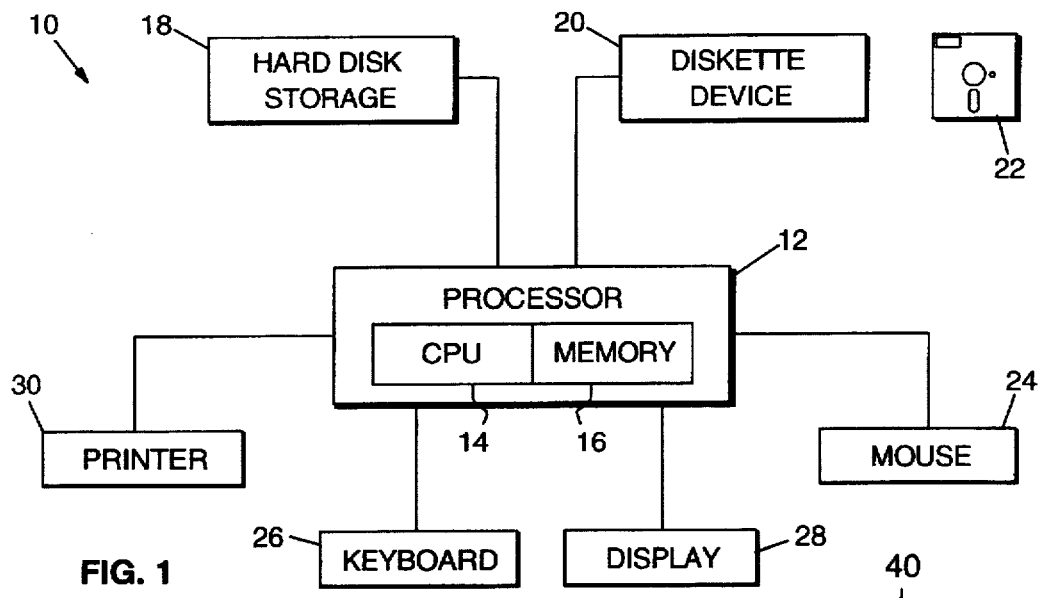
FIG. 1 is a schematic illustration of a data processing system which may be used in accordance with the present invention.

Referring first to FIG. 1, there, is shown, in block diagram form, a data processing system 10 in accordance with the present invention. In the preferred embodiment, the data processing system 10 comprises a transportable or laptop-type computer. The system 10 includes a processor 12; which includes a central processing unit (CPU) 14, and a memory 16. Additional storage, in the form of a hard disk storage 18 and a diskette device 20, may be interconnected to the processor 12. The diskette device 20 receives a diskette 22 which has computer program code recorded thereon that may implement the present invention in the system 10. The system 10 may also include user interface hardware, such as a mouse 24 and a keyboard 26 for allowing user input to the processor 12 and a display screen 28 for presenting visual data to the user. The system 10 may include a printer 30, Referring next to FIG. 2, one embodiment of the present invention is illustrated in use on a laptop computer 40. As shown on a screen 42 of the laptop computer 40, there is an active window generally identified by reference numeral 44. Although not shown, there may be other inactive windows on the screen 42 in addition to the active window 44. Also, there may be a plurality of icons such as, for example, folder icon 46 and printer icon 48. Within the active window 44; there is a moving visible area, generally identified by reference numeral 50, and obscured area(s), generally identified by reference numeral 52. For the sake of convenience, and due to limitations of drawing figures, the obscured area 52 is shown throughout the drawings herein as a "greyed" area, however, it is to be understood that the obscured area may be obscured by a plurality of different means. For example., the obscured area 52 may be completely blank (whited out); completely blackened, covered with overwriting (such as, for example, X'd out), "blurry" or faint writing, and etc. The exact appearance of the obscured area 52 may vary at the user's option while still maintaining the spirit and scope of the present invention; i.e., reducing the likelihood of unwanted observation of computer data by others.

Figure 2:
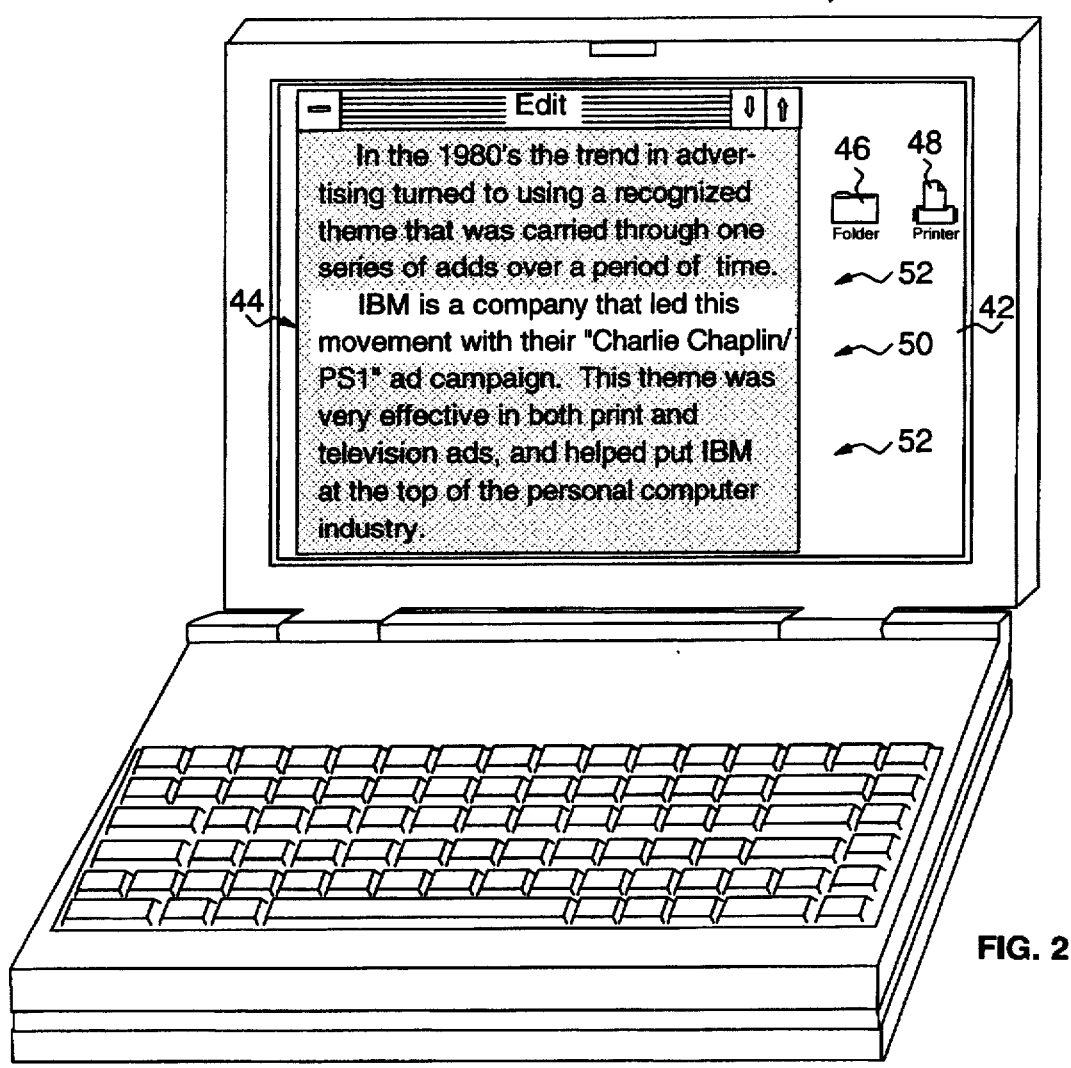
FIG. 2 is an illustration of one embodiment of the present invention.

In the embodiment shown in FIG. 2, the visible area 50 comprises a plurality of lines of information. As is readily apparent from the use of the term "plurality", the number of lines visible in the visible area 50 may comprise 2 or more. In addition, the number of visible lines may include: a current working line (such as a line being currently edited or viewed) and one or more lines above, one or more lines below, or a combination thereof. It is to be understood, that it would be a selectable option to determine the number of lines of information that would be visible in the visible area 50. The visible area 50 moves as the user progresses through the data by following the position of a current position cursor, a mouse pointer, a pen-like device; or a predefined keystroke combination.

Another option which may be selected by the user is the use of standard visible information. For example, a user may select the option that certain predefined areas or information may always remain visible in addition to the moving visible areas. This would allow the user to see such things as the date (or date area), title of a document (or title area), or etc. Although not shown, it is to be understood that the present invention is similarly adaptable to and useful with graphical data.

Figure 3:
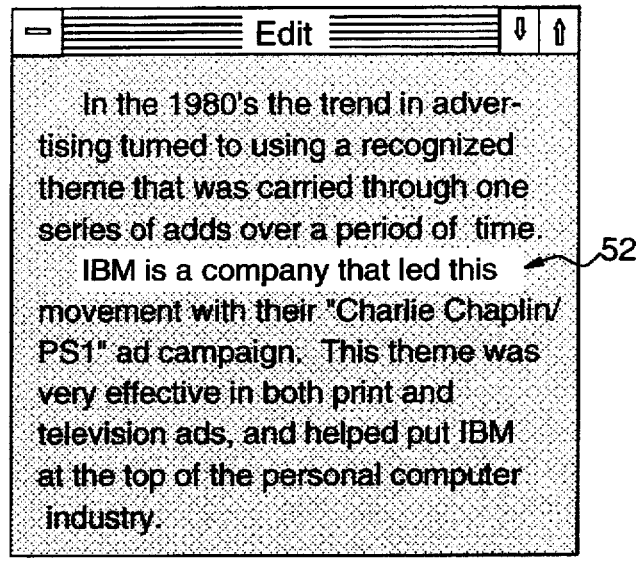
FIG. 3 is an illustration of an alternative embodiment of the present invention.
Figure 4:
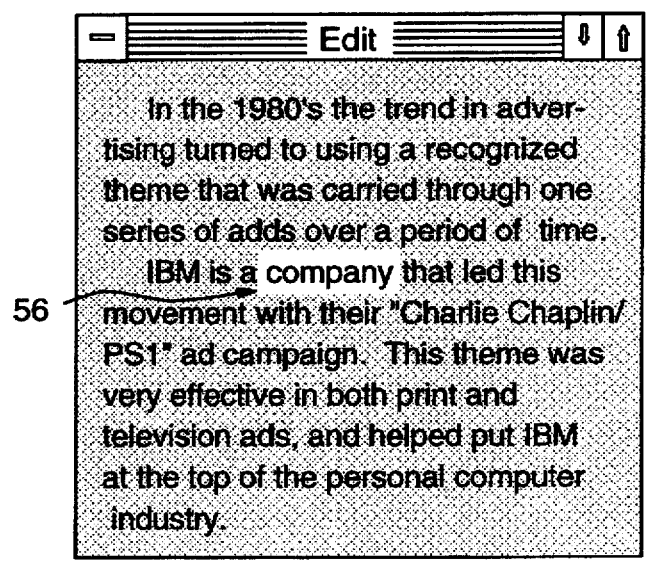
FIG. 4 is an illustration of still another alternative embodiment of the present invention.

Referring next to FIGS. 3 and 4, alternative embodiments of the present invention are illustrated. As shown in FIG. 3, rather than a plurality of lines of visible text in a visible area 54, there is only one line of text visible. In FIG. 4, a visible area 56 is reduced to a single word or data string. As a user works with or reads the data shown in FIGS. 2, 3, and 4, the visible area may be moved in conjunction with the position of a current position cursor, movement of a mouse pointer, selection by a pen-like device or finger on a touch screen, or a predefined keystroke combination.

By using the present invention, a user, by selecting the appropriate options, may still do whatever work is necessary on the computer even when in a crowded environment where other people would be able to view the screen. The user may select an option to make it difficult to view all but the visible area on the computer screen (i.e., by greying the obscured area) or to make it impossible for another to view the obscured area (i.e., completely blackening or completely whiting out). These options may allow the user the ability to see everything on the screen while making it difficult or impossible for another or to be able to see the data. Therefore, the present invention provides a user-selectable level of security for on-screen data.

Figure 5:
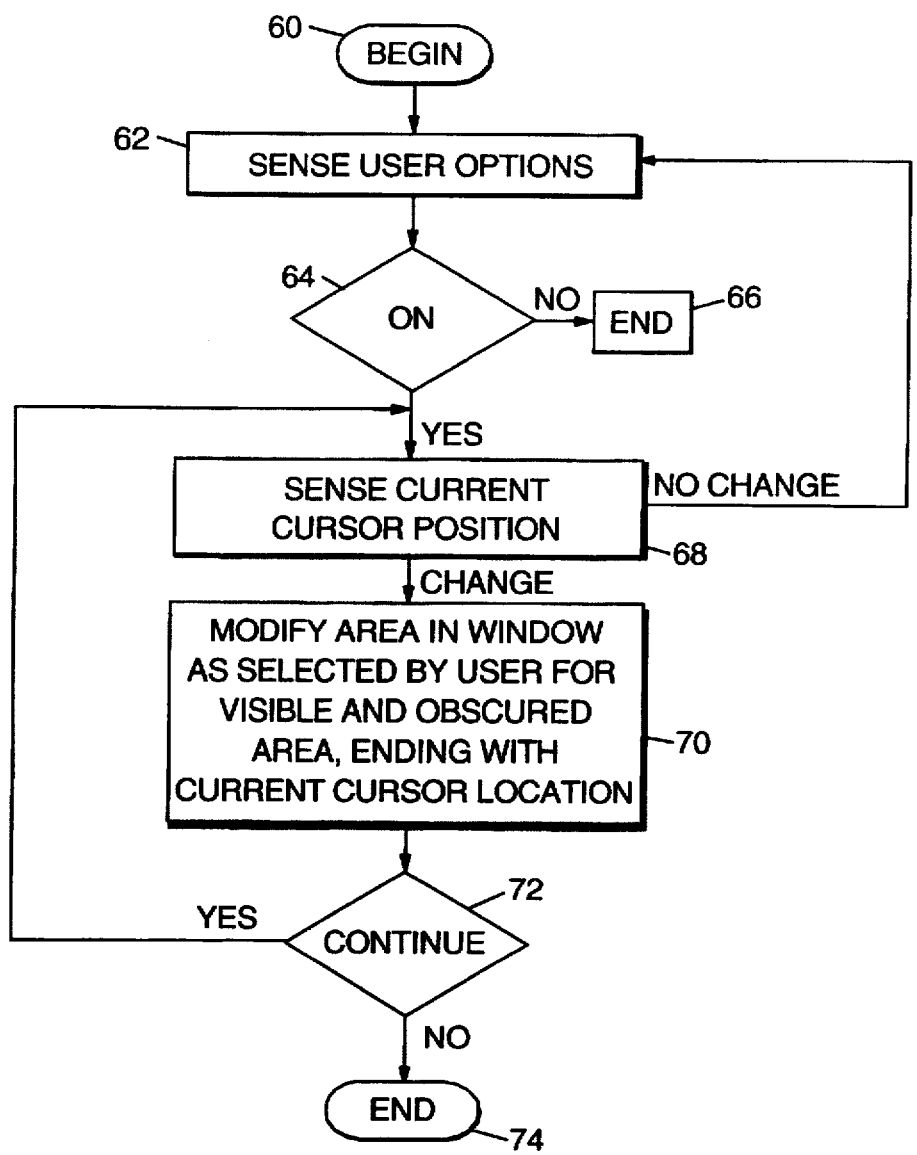
FIG. 5 is a flowchart illustrating the present invention.

Referring to FIG. 5, a flowchart illustrating the present invention is shown. The present invention begins at 60 followed by sensing of the user-selected options at, block 62. Such options may comprise the size of the visible area, the style used for the obscured area, and/or whether to turn the present invention on/off. At decision block 64, it is determined whether or not the present invention is selected for use by the user. If the response to decision block 64 is no, the present invention ends at 66 and the user is presented with a normal operating screen. If the response to decision block 64 is yes, the current cursor position is sensed at block 68. If there is no change to the cursor position, the present invention returns to sense user options at block 62. If there is a change to the current cursor position, the area in the active window is modified as selected at block 62 by the user for the visible and/or obscured areas ending with the current cursor location. At decision block 72, it is then determined whether or not to continue. If the response to decision block 72 is yes, the present invention returns to block 68 to sense the current cursor position. If the response to decision block 72 is no, the present invention ends at 74.

Thus, the present invention provides a method and apparatus for reducing the likelihood of unwanted observation of on-screen computer data by unauthorized personnel. A user may work more freely with computer data on any computer (especially a port-able computer) even when in a crowded environment (such as on an airplane) with reduced fear of unauthorized disclosure of sensitive information. Improved security is available through use of the present invention without the necessity of attempting to shield others (such as with the use of a cumbersome and awkward hood) from viewing the on-screen data.

Although the present invention has been particularly shown and described with reference to a preferred embodiment, it will be understood by those skilled in the art that various changes in form and detail may be made without departing from the spirit and the scope of the invention.

What we claim is:

1. A method of reducing a likelihood of unauthorized observation of data on a computer screen upon which at least one software application is running in a panel having a pre-sized area for viewing the data on an active window, comprising the steps of:

forming, upon an optional selection by a user, a predefined user visible area on the active window which is adjustably moveable by said user within the pre-sized area for viewing the data on the active window, said user visible area containing at least a portion of the data on the active window clearly visible to said user; and forming an obscured but not invisible area on the active window comprising the pre-sized area for viewing the data other than said user visible area, wherein said user controls what data appears on the active window in said user visible area by moving said user visible area within the pre-sized area for viewing.

2. The method of claim 1, wherein said step of forming a user visible area comprises:

forming a user visible area comprising only a single currently used data string.

3. The method of claim 1, wherein said step of forming a user visible area comprises:

forming a user visible area comprising at least a currently used line of data.

4. The method of claim 1, wherein said step of forming an obscured area comprises:

forming a greyed area.

5. A computer system for reducing a likelihood of unauthorized observation of data on a computer screen upon which at least one software application is running in a panel having a pre-sized area for viewing the data on an active window, comprising:

means for forming, upon optional selection by a user, a predefined user visible area on the active window which is adjustably movable by said user within the presized area for viewing the data on the active window, said user visible area containing at least a portion of the data on the active window clearly visible to said user; and means for forming an obscured but not invisible area on the active window comprising the pre-sized area for viewing the data other than said user visible area, wherein said user controls what data appears on the active window in said user visible area by moving said user visible area within the pre-sized area for viewing.

6. The computer system of claim 5, wherein said means for forming a user visible area comprises:

means for forming a user visible area comprising only a single currently used data string.

7. The computer system of claim 5, wherein said means for forming a user visible area comprises:

means for forming a user visible area comprising at least a currently used line of data.

8. The computer system of claim 5, wherein said means for forming an obscured area comprises:

means for forming a greyed area.

9. A computer program product recorded on computer readable medium for reducing a likelihood of unauthorized observation of data on a computer screen upon which at least one software application is running in a panel having a pre-sized area for viewing the data on an active window, said product comprising:

computer readable means for forming, upon optional selection by a user, a predefined user visible area on the active window which is adjustably moveable by said user within the pre-sized area for viewing the data on the active window, said user visible area containing at least a portion of the data on the active window clearly visible to said user; and computer readable means for forming an obscured but not invisible area on the active window comprising the pre-sized area for viewing the data other than said user visible area, wherein said user controls what data appears on the active window in said user visible area by moving said user visible area within the pre-sized area for viewing.

10. The program product as claimed in claim 9, wherein said computer readable means for forming a user visible area comprises:

computer readable means for forming a user visible area comprising only a single currently used data stream.

11. The program product as claimed in claim 9, wherein said computer readable means for forming a user visible area comprises:

computer readable means for forming a user visible area comprising at least a currently used line of data.

12. The program product as claimed in claim 9, wherein said computer readable means for forming an obscured area comprises:

means for forming a greyed area.

* * * * *